F. SHOEMAKER.
Cutting Apparatus.
No. 220,256. Patented Oct. 7, 1879.
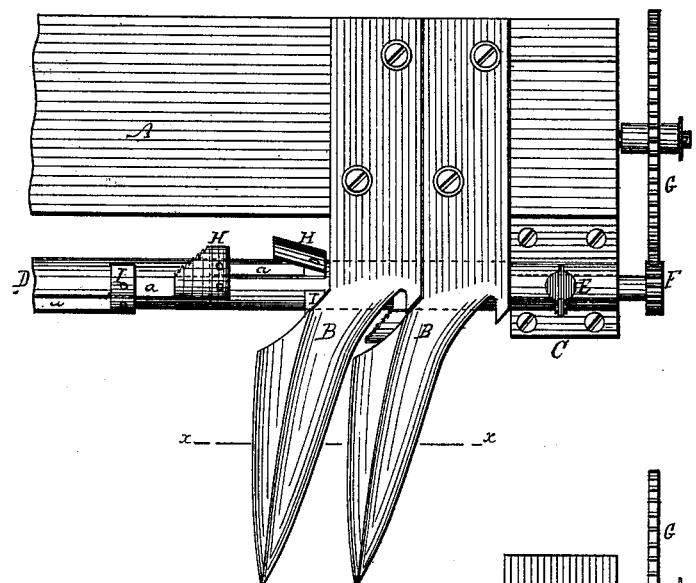
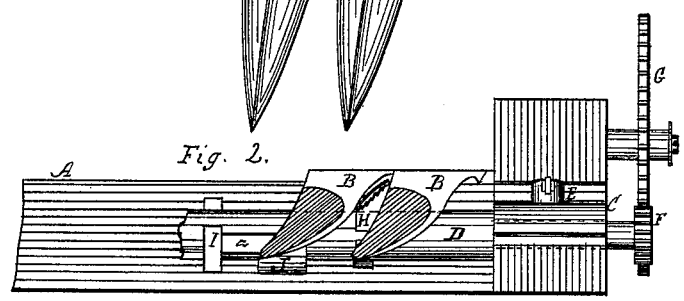
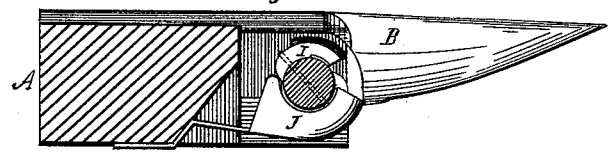
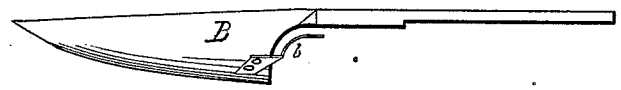
Witnesses.
T. J. Williams
A. B. Robertson
Inventor.
Frederick Shoemaker
per T. J. W. Robertson
Associate Attorney

UNITED STATES PATENT OFFICE.

FREDERICK SHOEMAKER, OF KINDERHOOK, NEW YORK.

IMPROVEMENT IN CUTTING APPARATUS.

Specification forming part of Letters Patent No. 220,256, dated October 7, 1879; application filed March 12, 1879.

*To all whom it may concern:*

Be it known that I, FREDERICK SHOEMAKER, of the town of Kinderhook, in the county of Columbia and State of New York, have invented certain new and useful Improvements in Harvester-Cutters; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 is a plan; Fig. 2, a front view with the fingers cut off at the line $x\,x$; Fig. 3, a detail showing the finger-bar and shaft in cross-sections; and Fig. 4, a detail showing one of the fingers in a reverse position to that exhibited in Fig. 3.

This invention relates to that class of harvester-cutters which are attached to revolving horizontal shafts; and it consists more especially in the peculiar arrangement and construction of the cutters and fingers and the means of securing the cutters to the shaft.

In the drawings, A represents the finger-bar, to which the fingers B are attached, and having at each extremity boxes C C, for the journals of the shaft D, the boxes being provided with lubricating devices E E. On one end of the shaft is a pinion, F, receiving motion from the spur-wheel G, which is intended to be connected by suitable gearing with the main driving-wheel. Attached to this shaft, at convenient distances apart, are to be as many sets of knives or cutters H as there are to be fingers on the bar, each set of knives consisting of two arranged opposite each other, and attached in any convenient manner to the shaft; but I prefer the mode shown in the drawings, in which L-shaped bed-pieces or holders I are used for this purpose. These may be made of any suitable material; but I prefer cast malleable iron, in which case the holder or bed I and the extension-plate $a$ may be formed in one piece; or, if preferred, the holder I and extension-plate $a$ may be made separately and secured together. These holders are connected with the shaft by bolts or rivets, each bolt passing through the two holders of each set of knives and the extension-plates $a$ of the next set. By this arrangement the holders are thoroughly secured, a multiplicity of fastenings is avoided, which, by requiring many holes in the shaft, would weaken it, and the knives are arranged spirally around the shaft, whereby the strain on the shaft and the power required to drive it are both equalized.

The knives or cutters H may be attached to the holders by rivets or screws, at the option of the maker. If it is preferred to make the holder and the extension-plate in separate pieces, the rivets used for securing the knives to the holders may also be used for uniting the holders to the extension-plates. The knives are curved, being arcs of true circles, and are so set on their holders that all parts of the back are about equidistant from the shaft; but as the faces of the holders are arranged at a small angle with the shaft, the cutters are held in a slightly-flaring position, which makes the rear corner of their cutting-edges project from one-eighth to one-quarter of an inch farther from the shaft than the front portion.

The fingers are of peculiar construction, their acting parts being of such form and taper as to press the incoming grain to one side, so that it may pass between the knives and the edges forming the slot in the finger through which the knives pass, which, owing to the angle at which these edges are set with respect to the knives, causes the sickle-edges of the knives to act with a draw-cut, whereby the smallest and lightest straw passing into the fingers will be surely severed. If, however, smooth-edged knives are preferred, the bevel of the knife should be changed so as to meet the edges forming the slot in the finger at an angle more or less acute, as judgment may dictate, so as to increase the drawing effect of the cut. The edges of the slot do not terminate at the division-line between the fingers, but the divisions are carried to one side, so as to prevent any straw being forced into them should the fingers not be very closely fitted. The lower edge of the slot should be made, preferably, of a steel plate, $b$, secured by riveting or otherwise to the finger, although, if preferred, it may be cast with the finger.

Attached to the bottom part of each finger, and to the finger-bar, is a sheath, J, to cover up the knives, which sheath also serves as a brace to the finger, so that not only is the finger strengthened, but the knives guarded from contact with stones and other matter that would tend to dull their edges. The shaft and gearing should also be provided with suitable sheathing.

By the construction here shown a practical revolving-cutter harvester may be made, and thereby the lost power, friction, wear, and noise incidental to the use of the reciprocating cutters now used in harvesters may be avoided.

Although I have shown, and prefer, the knives to be set slightly flaring, yet I do not limit myself to this form, as the holders may be so shaped as to hold the knives parallel with the shaft.

What I claim as new is—

1. The combination of the rotary shaft D and the knives H with fingers B, having curved slots for the passage of the knives, substantially as described.

2. The combination, with rotary knives H, of fingers B, having curved-under portions, and plates $b$, correspondingly curved, to form curved slots for the passage of the knives, substantially as specified.

3. The combination, with the shaft D and knives H, of the L-shaped holders I, substantially as described.

4. The combination, with the shaft D, of the holders I, having their faces on which the cutters rest concentric with the circumference of the shaft and diagonally as respects its length, substantially as shown and described.

5. A finger, B, having an extension on one side of its shank projected beyond the nearest guiding-line of the next finger, and a recess in said extension in line with the opening between the fingers, substantially as and for the purpose specified.

In testimony that I claim the foregoing as my own I affix my signature in presence of two witnesses.

FREDERICK SHOEMAKER.

Witnesses:
  WM. W. TURLAY,
  HENRY SHELDON.